(12) United States Patent
Chisholm et al.

(10) Patent No.: US 6,437,054 B1
(45) Date of Patent: *Aug. 20, 2002

(54) COMPOSITION OF POLYESTER SULFONATE SALT IONOMER, POLYAMIDE AND POLYEPOXIDE

(75) Inventors: Bret J. Chisholm, Clifton Park, NY (US); Robert R. Gallucci, Mt. Vernon, IN (US); Josef H. P. Bastiaens, Bergen Op Zoom (BE)

(73) Assignee: General Electric Company, Pittsfield, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/251,507

(22) Filed: Feb. 17, 1999

(51) Int. Cl.⁷ .............................. C08L 67/03; C08L 77/02
(52) U.S. Cl. ............................ 525/423; 65/111; 65/425
(58) Field of Search ................ 525/423, 425, 525/65, 111

(56) References Cited

U.S. PATENT DOCUMENTS

| | | |
|---|---|---|
| 2,465,319 A | 3/1949 | Whinfield et al. |
| 3,018,272 A | 1/1962 | Griffing et al. |
| 3,047,539 A | 7/1962 | Pengilly |
| 3,546,008 A | 12/1970 | Shields et al. ........... 117/138.8 |
| 3,884,882 A | 5/1975 | Caywood, Jr. |
| 4,097,446 A | 6/1978 | Abolins et al. |
| 4,147,740 A | 4/1979 | Swiger et al. |
| 4,174,358 A | 11/1979 | Epstein ........................ 525/183 |
| 4,251,644 A | 2/1981 | Joffrion ......................... 525/64 |
| 4,315,086 A | 2/1982 | Ueno et al. .................. 525/391 |
| 4,346,194 A | 8/1982 | Roura ........................... 525/66 |
| 4,474,927 A | 10/1984 | Novak ........................... 525/66 |
| 4,659,760 A | 4/1987 | van der Meer .............. 524/141 |
| 4,732,938 A | 3/1988 | Grant et al. ................... 525/92 |
| 4,755,566 A | 7/1988 | Yates, III ...................... 525/391 |
| 4,877,848 A | * 10/1989 | Maresca ....................... 525/423 |
| 4,908,277 A | * 3/1990 | Tsunashima et al. ......... 528/295 |
| 4,957,980 A | * 9/1990 | Kobayashi et al. .......... 525/423 |
| 5,037,900 A | * 8/1991 | Yoshino et al. .............. 525/423 |
| 5,300,332 A | * 4/1994 | Kawaguchi et al. ......... 525/437 |
| 5,300,572 A | 4/1994 | Tajima et al. ................. 525/167 |

FOREIGN PATENT DOCUMENTS

| | | |
|---|---|---|
| DE | 42 34 959 C1 | 4/1994 |
| EP | 0 227 053 A2 | 7/1987 |
| EP | 0 518 703 A2 | 12/1992 |
| EP | 0 664 320 A1 | 7/1995 |
| JP | 63-6271 | * 11/1994 |
| JP | 4-77550 | * 5/1999 |

* cited by examiner

Primary Examiner—Robert E. L. Sellers

(57) ABSTRACT

A thermoplastic resin composition comprises a compatible resin blend of a polyester sulfonate salt ionomer and a polyamide and at least one difunctional epoxy compound having at least one cyclohexane ring moiety and two terminal epoxy functional groups, wherein at least one of the two terminal epoxy functional groups is a substituent on the at least one cyclohexane ring moiety; and, optionally, a catalyst compound or rubber impact modifier.

13 Claims, No Drawings

COMPOSITION OF POLYESTER SULFONATE SALT IONOMER, POLYAMIDE AND POLYEPOXIDE

FIELD OF THE INVENTION

The invention relates to a molding composition comprising a polyester ionomer resin and a polyamide resin.

BACKGROUND OF THE INVENTION

Blending of an aromatic polyester resin and a polyamide resin offers the advantage of reduced moisture absorption compared to pure polyamide and higher heat compared to pure aromatic polyester. However, such blends are incompatible resulting in poor surface appearance, delamination, poor ductility, and difficult injection molding. The advantage of incorporating sulfonate salt groups into a poly(1,4-butulene terephthalate) polyester is that the sulfonate groups impart inherent compatibility between the sulfonated polyester ionomer and polyamide resulting in improved surface appearance, reduced delamination, and improved processability. However the blends still are britt;e with poor elongation.

U.S. Pat. No. 4,097,446 to Abolins and Holub discloses a wide variety of blends of different thermoplastic resins with a very rapidly crystallizing polyester; namely polybutylene terephthalate and fiber glass. Nylon is shown as an example of a suitable blend resin. Fiber glass is important in obtaining improved processability.

U.S. Pat. No. 5,300,572 to Tajima, et al. relates to moldable polyester resin compositions which include the resin components: (A) between 2 to 98% by weight of a compatibilizing metal sulfonate group-containing aromatic polyester copolymer which is the polycondensation reaction product of (a) an aromatic dicarboxylic acid or its ester-forming derivative, (b) a diol compound or its ester-forming derivative, and (c) an ester-forming compound containing a metal sulfonate group; (B) between 2 to 98% by weight of an additive resin which is one of (B-I) an olefin copolymer which is the copolymerization reaction product between an olefin with at least one of an alpha,.beta.-unsaturated carboxylic acid or its derivative and a vinyl alcohol or its ester, and (B-II) a polyamide resin; and, optionally (C) between 0 to 96% by weight of a non-compatibilizing aromatic polyester resin.

As set forth in Tajiima, et al. the modified aromatic polyester copolymer having metal-sulfonate-containing units introduced into the copolymer's backbone structure of aromatic polyester copolymer is compatible with both polyolefin and polyamide resins, and serves as a compatibilizer when an unmodified (i.e., one not containing metal-sulfonate units) aromatic polyester is further blended with the modified polyester copolymer and either a polyolefin or a polyamide resin.

A problem with blends of comprising a polyester ionomer resin and a polyamide resin is the lack of ductility. Despite improved compatibilization of the polyamide blend with the polyester sulfonate salt, leading to finer morphology and better appearance than a blend of nylon with a standard thermoplastic polyester, the blends show poor elongation and impact. The melt strength is also deficient for processes like blow molding, profile extrusion and thermoforming. An additional problem may be encountered if the polyester ionomer and polyamide resin blend is not dried well before processing. Hydrolysis may cause molecular weight degradation which also may result in a reduction in mechanical properties.

Accordingly, there is a need for improved polyester resin compositions which exhibit improved elongation, good appearance and good melt processing capability.

SUMMARY OF THE INVENTION

We have found that modification of a blend of an aromatic metal sulfonate co-polyester resin and a polyamide resin with an effective amount of at least one difunctional epoxy compound results in improved polyester resin compositions which exhibit consistent and uniform properties, improved elongation at break and good appearance. The resulting blends have good chemical resistance, mechanical properties along with good processability and reduced moisture absorbance.

In accordance with the present invention, there is provided a thermoplastic resin composition having improved elongation and temperature resistance comprising a compatible resin blend of a polyester ionomer and a polyamide and an effective amount of at least one difunctional epoxy compound, said at least one difunctional epoxy compound having at least one cyclohexane ring moiety and having two terminal epoxy functional groups, wherein at least one of the two terminal epoxy functional groups is a substituent on at least one cyclohexane ring moiety; and optionally an effective amount of a catalyst compound.

According to the preferred embodiments, a functional sulfonate salt "ionomer" group is incorporated into the polyester so that a blends of polyester ionomer have improved properties as compared to blends not utilizing the polyester ionomer and not having the epoxy additive.

DETAILED DESCRIPTION OF PREFERRED EMBODIMENTS

The term polyester ionomer, or sulfonate polyester or metal sulfonate polyester, refers to polyester polymers derived from the reaction residue of an aryl carboxylic sulfonate salt, an aromatic dicarboxylic acid, an aliphatic diol or any of their ester forming derivatives. The ionomer polyester polymers comprise some monovalent and/or divalent sulfonate salt units represented by the formula IA:

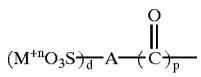

or formula IB:

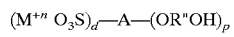

wherein p=1–3; d=1–3, and p+d=2–6, and A is an aryl group containing one or more aromatic rings: for example, benzene, naphthalene, anthracene, biphenyl, terphenyl, oxy diphenyl, sulfonyl diphenyl or alkyl diphenyl, where the sulfonate substituent is directly attached to an aryl ring. These groups are incorporated into the polyester through carboxylic ester linkages. The aryl groups may contain one or more sulfonate substituents; d=1–3 and may have one or more carboxylic acid linkages; p=1–3. Groups with one sulfonate substituent (d=1) and two carboxylic linkages (p=2) are preferred. M is a metal, n=1–5. Preferred metals are alkaline or alkaline earth metals where n=1–2. Zinc and tin are also preferred metals. R' is a alkyl group, for example, $-CH_2CH_2-$, $-CH_2CH_2OCH_2CH_2-$, $-CH(CH_3)CH_2-$, $-CH_2CH_2CH_2-$, $-CH_2CH_2CH_2CH_2-$.

Typical sulfonate substituents that can be incorporated into the metal sulfonate polyester copolymer may be derived from the following carboxylic acids or their ester forming derivatives; sodium sulfo isophthalic acid, potassium sulfo terephthalic acid, sodium sulfo naphthalene dicarboxylic acid, calcium sulfo isophthalate, potassium 4,4'-di (carbomethoxy) biphenyl sulfonate, lithium 3,5-di (carbomethoxy)benzene sulfonate, sodium p-carbomethoxy benzene sulfonate, dipotassium 5-carbomethoxy-1,3-disulfonate, sodio 4-sulfo naphthalene-2,7-dicarboxylic acid, 4-lithio sulfophenyl-3,5-dicarboxy benzene sulfonate, 6-sodiosulfo-2-naphthyl-3,5-dicarbomethoxy benzene sulfonate and dimethyl 5-[4-(sodiosulfo) phenoxy] isophthalate. Other suitable sulfonate carboxylic acids and their ester forming derivatives are described in U.S. Pat. Nos. 3,018,272 and 3,546,008 which are included herein by reference. The most preferred sulfonate polyesters are derived from sodium 3,5-dicarbomethoxy benzene sulfonate.

Preferred ionomer polyester polymer comprises divalent ionomer units represented by the formula II:

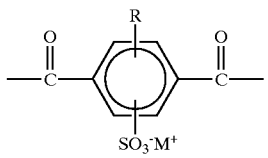

wherein R is hydrogen, halogen, alkyl or aryl, and M is a metal.

The most preferred polyester ionomer has the formula III:

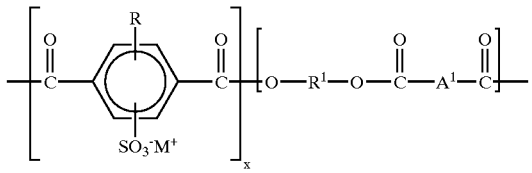

where the ionomer units, x, are from 0.1–50 mole percent of the polymer with 1.0 to 20 mole percent being preferred. Most preferably R is hydrogen. When R is hydrogen, $A^1$ is phenylene, and $R^1$ is an alkylene radical of from $C^1$–$C^{12}$, preferably from $C^2$ or $C^4$, and x and y are in mole percent, then x is from about 1 to about 20 percent, and more preferably from about 1 to about 10 percent.

Typical glycol or diol reactants, $R^1$, include straight chain, branched, or cycloaliphatic alkane diols and may contain from 2 to 12 carbon atoms. Examples of such diols include but are not limited to ethylene glycol; propylene glycol, i.e., 1,2- and 1,3-propylene glycol; butane diol, i.e., 1,3- and 1,4-butane diol; diethylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; triethylene glycol; 1,10-decane diol; and mixtures of any of the foregoing. A preferred cycloaliphatic diol is 1,4-cyclohexane dimethanol or its chemical equivalent. When cycloaliphatic diols are used as the diol component, a mixture of cis- to trans-isomers may be used, it is preferred to have a trans isomer content of 70% or more. Chemical equivalents to the diols include esters, such as dialkyl esters, diaryl esters and the like.

Examples of aromatic dicarboxylic acid reactants, as represented by the decarboxylated residue $A^1$, are isoph-thalic or terephthalic acid, 1,2-di(p-carboxyphenyl)ethane, 4,4'-dicarboxydiphenyl ether, 4,4' bisbenzoic acid and mixtures thereof. All of these acids contain at least one aromatic nucleus. Acids containing fused rings can also be present, such as in 1,4–1,5- or 2,6-naphthalene dicarboxylic acids. The preferred dicarboxylic acids are terephthalic acid, isophthalic acid or mixtures thereof.

The most preferred ionomer polyesters are poly(ethylene terephthalate) (PET) ionomers, and poly(1,4-butylene terephthalate) ionomers, (PBT), and (polypropylene terephthalate) (PPT) ionomers.

Also contemplated herein are the above polyester ionomers with minor amounts, e.g., from about 0.5 to about 15 percent by weight, of units derived from aliphatic acid and/or aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

The preferred poly(1,4-butylene terephthalate) ionomer resin used in this invention is one obtained by polymerizing an ionomer component comprising a dimethyl 5-sodium sulfo-1,3-phenylenedicarboxylate, from 1 to 10 mole %, a glycol component of at least 70 mole %, preferably at least 90 mole %, of tetramethylene glycol and an acid component of at least 70 mole %, preferably at least 90 mole %, of terephthalic acid, and polyester-forming derivatives therefore.

The glycol component should contain not more than 30 mole %, preferably not more than 20 mole %, of another glycol, such as ethylene glycol, trimethylene glycol, 2-methyl-1,3-propane glycol, hexamethylene glycol, decamethylene glycol, cyclohexane dimethanol, or neopentylene glycol.

The acid component should contain not more than 30 mole %, preferably not more than 20 mole %, of another acid such as isophthalic acid, 2,6-naphthalene dicarboxylic acid, 1,5-naphthalene dicarboxylic acid, 4,4'-diphenyldicarboxylic acid, 4,4'-diphenoxyethane dicarboxylic acid, p-hydroxy benzoic acid, sebacic acid, adipic acid and polyester forming derivatives thereof.

It is also possible to use a branched polyester ionomers in which a branching agent, for example, a glycol having three or more hydroxyl groups. Furthermore, it is sometimes desirable to have various concentrations of acid and hydroxyl end groups on the polyester, depending on the ultimate end-use of the composition.

In some instances, it is desirable to reduce the number of acid end groups, typically to less than about 30 micro equivalents per gram, with the use of acid reactive species. In other instances, it is desirable that the polyester has a relatively high carboxylic end group concentration.

Blends of polyesters ionomers with non sulfonate salt polyesters may also be employed as the polyester ionomer composition. For example, the invention may consist of a blend of sulfonate salt PBT and the unmodified PBT resin. Preferred non sulfonate salt polyesters are the alkylene phthalate polyesters.

It is preferred that the sulfonate salt polyester be present in amounts greater than or equal to the non sulfonate salt polyester.

Overall the blend can have from 5–95 wt. % polyamide and 95–5 wt. % total polyester where at least 20 wt. % and preferably greater than or equal to 50 wt. % of the polyester is sulfonate salt polyester copolymer.

The polyamide component of the resin blend comprises a suitable polyamide. Typical polyamide resins include polyamide-6, polyamide-6,6, polyamide-11, polyamide-12, polyamide-4,6, polyamide-6,10 and polyamide-6,12, as well as polyamides prepared from terephthalic acid and/or isophthalic acid and trimethylhexamethylenediamine; from adipic acid and m-xylylenediamines; from adipic acid, azelaic acid, 2,2-bis-(p-aminocyclohexyl) propane, and from terephthalic acid and 4,4'-diaminodicyclohexylmethane. Mixtures and/or copolymers of two or more of the foregoing polyamides or prepolymers thereof, respectively, are also within the scope of the present invention.

Furthermore, the polyamides may be made by any known method, including the polymerization of a monoamino monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above, together with substantially equimolar proportions of a diamine and a dicarboxylic acid. The dicarboxylic acid may be used in the form of a functional derivative thereof, for example, a salt, an ester or acid chloride.

A detailed description of polyamides and polyamide presursor materials is provided in U.S. Pat. No. 4,755,566 to Yates. Other useful polyamides often referred to as "Nylons" are disclosed in U.S. Pat. No. 4,732,938 to Grant et al., U.S. Pat. No. 4,659,760 to Van der Meer, and U.S. Pat. No. 4,315,086 to Ueno et al., each also incorporated herein by reference. The polyamide used may also be one or more of those referred to as "toughened nylons", which are often prepared by blending one or more polyamides with one or more polymeric or copolymeric elastomeric toughening agents. Examples of these types of materials are given in U.S. Pat. Nos. 4,174,358; 4,474,927; 4,346,194; 4,251,644; 3,884,882; 4,147,740; all incorporated herein by reference.

The preferred polyamides for this invention are polyamide-6;6,6;6,12;11 and 12, with the most preferred being polyamide-6,6.

The resin blend includes an effective amount of at least one difunctional epoxy compound. The preferred difunctional polyepoxy compound is 3,4-epoxycyclohexylmethyl-3,4-epoxycyclohexane carboxylate. The preferred catalysts are salts of aliphatic or aromatic carboxylic acids.

The epoxy component is at least one difunctional epoxy compound. By difunctional epoxy compound is meant a compound having two terminal epoxy functionalities. Preferably the compound will contain only carbon, hydrogen and oxygen. The compound will preferably have a molecular weight of below about 1000 to facilitate blending with the polyester resin.

Preferred difunctional epoxy compounds will have at least one of the epoxide groups on a cyclohexane ring. Examples of preferred difunctional epoxy compounds are 3,4-epoxycyclohexylmethyl-3,4-epoxycyclohexane carboxylate, bis(3,4-epoxycyclohexyl) adipate, vinylcyclohexene di-epoxide, , epoxy cyclohexane adducts of carboxylic acids and the like. Especially preferred is 3,4-epoxycyclohexylmethyl-3,4-epoxycyclohexane carboxylate.

The difunctional epoxide compounds can be made by techniques well known to those skilled in the art. For example, the corresponding alpha, beta.-dihydroxy compounds can be dehydrated to produce the epoxide groups, or the correspondingly unsaturated compounds can be epoxidized by treatment with a peracid, such as peracetic acid, in well-known techniques. The compounds are also commercially available.

The difunctional epoxy compound may be employed in any. effective amount, but preferably small amounts are use, e.g., at a range of about 0.1 to about 5 percent by weight. However, a particularly preferred range is from about 0.1 to about 3.5 percent by weight. A more preferred range is from about 0.5 to about 2 percent by weight. Within this particularly preferred range it has been found advantageous to employ in certain compositions from about 1 to about 2.0 percent by weight of the difunctional polyepoxy compound. All percentages are based on the total weight of the blend.

Another optional component of the present invention consists of the catalyst compound. Preferred catalysts are salts free from direct carbon-phosphorous bonds and containing at least one of alkali metal cations and halide anions. It is apparent that this class contains a large number of compounds. They include alkali metal halides, alkali metal carboxylates, and alkali metal carbonates and bicarbonates.

Illustrative compounds within this class are lithium fluoride, lithium iodide, potassium bromide, potassium iodide, sodium acetate, sodium benzoate, sodium caproate, sodium stearate, and potassium oleate.

The catalyst component can be present in the composition of the present invention in any effective amount. Preferably the catalyst is present in an amount ranging from about 0.01 to about 1 weight percent, more preferably from about 0.03 to about 0.1 weight percent based on the total weight of the resin composition.

The composition may optionally contain impact modifiers such as a rubbery impact modifier. Preferably such impact modifiers are utilized in an amount less than about 30%, and preferably from 1 to 25% by weight, more preferably less than about 20 percent, even more preferably less than about 15 percent by weight based on the total weight of the composition. Typical impact modifiers are derived from one or more monomers selected from the group consisting of olefins, vinyl aromatic monomers, acrylic and alkylacrylic acids and their ester derivatives as well as conjugated dienes. Especially preferred impact modifiers are the rubbery high-molecular weight materials showing elasticity at room temperature. They include both homopolymers and copolymers, including random, block, radial block, graft and core-shell copolymers as well as combinations thereof. Suitable modifiers include core-shell polymers built up from a rubberlike core on which one or more shells have been grafted. The core typically consists substantially of an acrylate rubber or a butadiene rubber. One or more shells typically are grafted on the core. The shell preferably comprises a vinylaromatic compound and/or a vinylcyanide and/or an alkyl(meth) acrylate. The core and/or the shell(s) often comprise multi functional compounds which may act as a cross-linking agent and/or as a grafting agent. These polymers are usually prepared in several stages.

Olefin-containing copolymers such as olefin acrylates and olefin diene terpolymers can also be used as impact modifiers in the present compositions. An example of an olefin acrylate copolymer impact modifier is ethylene ethylacrylate. Other higher olefin monomers can be employed in copolymers with alkyl acrylates, for example, propylene and n-butyl acrylate. The olefin diene terpolymers are well known in the art and generally fall into the EPDM (ethylene propylene diene) family of terpolymers. Polyolefins such as polyethylene, especially low density polyethylene (LDPE), and polyethylene copolymers with alpha olefins are also of use in these compositions. Polyolefin copolymers with gylcidyl acrylates or methacrylates may be especially effective in the impact modification of polyester containing blends. Terpolymers of ethylene with alkyl acrylates or methacrylates and glycidyl methacrylates may be especially preferred.

Styrene-containing polymers can also be used as impact modifiers. Examples of such polymers are acrylonitrile-butadiene-styrene (ABS), acrylonitrile-butadiene-alpha-methylstyrene, styrene-butadiene, styrene- butadiene-styrene (SBS), styrene-ethylene butylene-styrene (SEBS), methacrylate-butadiene-styrene (MBS), and other high impact styrene-containing polymers.

The polyolefin or SEBS rubbers can be further modified by reaction with maleic anhydride, itaconic anhydride and related unsaturated carboxylic acid anhydrides to give anhydride grafted rubbers.

Most preferred rubbery impact modifiers are MBS, SEBS and SEBS maleic anhydride grafted rubbers.

Additionally, it may be desired to employ inorganic fillers to the thermoplastic resin provided the favorable properties are not deleteriously effected. Typical inorganic fillers include: alumina, amorphous silica, anhydrous alumino silicates, mica, wollastonite, clays, talc, metal oxides such as titanium dioxide, zinc sulfide, ground quartz, and the like. Low levels (0.1–10.0 wt. %) of very small particle size (largest particles less than 10 microns in diameter) are preferred.

The composition of the present invention may include additional components which do not interfere with the previously mentioned desirable properties but enhance other favorable properties such as antioxidants, lubricants, mold release materials, colorants, nucleants or ultra violet (UV) stabilizers.

Flame-retardant additives are desirably present in an amount at least sufficient to reduce the flammability of the polyester resin, preferably to a UL94 V-0 rating. The amount will vary with the nature of the resin and with the efficiency of the additive. In general, however, the amount of additive will be from 2 to 30 percent by weight based on the weight of resin. A preferred range will be from about 15 to 20 percent.

Typically halogenated aromatic flame-retardants include tetrabromobisphenol A polycarbonate oligomer, polybromophenyl ether, brominated polystyrene, brominated BPA polyepoxide, brominated imides, brominated polycarbonate, poly (haloaryl acrylate), poly (haloaryl methacrylate), or mixtures thereof.

Examples of other suitable flame retardants are brominated polystyrenes such as polydibromostyrene and polytribromostyrene, decabromobiphenyl ethane, tetrabromobiphenyl, brominated alpha omega -alkylene-bis-phthalimides, e.g. N,N'-ethylene-bis tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins.

The flame retardants are typically used with a synergist, particularily inorganic antimony compounds. Such compounds are widely available or can be made in known ways. Typical, inorganic. synergist compounds include $Sb_2O_5$, $SbS_3$, sodium antimonate and the like. Especially preferred is antimony trioxide ($Sb_2O_3$). Synergists such as antimony oxides, are typically used at about 0.5 to 15 by weight based on the weight percent of resin in the final composition.

Also, the final composition may contain polytetrafluoroethylene (PTFE) type resins or copolymers used to reduce dripping in flame retardant thermoplastics.

The blends of this invention can be processed by various techniques including injection molding, blow molding, extrusion into sheet, film or profiles, compression molding and etc. They can also be formed into a variety of articles for use in, for example; electrical connectors, electrical devices, computers, building and construction, outdoor equipment, trucks and automobiles.

EXAMPLES

The following examples illustrate the present invention, but are not meant to be limitations to the scope thereof. The examples of Tables 1–6 where all prepared and tested in a similar manner:

All ingredients of the blend where tumbled together for 1–5 min. at room temperature and fed into a 30 mm twin screw extruder where they were melted and mixed at 520° F.; 300 rpm using vacuum venting All ingredients were throat fed. The compounded strands where cooled in a water bath, blown dry with air and chopped into pellets. Samples where dried for 4 h at 190° F. in a dehumidifying hopper dryer prior to injection molding.

Samples were injection molded on an 85 ton molding machine using the following conditions: barrel temperature, 510° F.; mold temperature, 150° F.; cycle time, 37 sec. Samples where immediately paced in a sealed foil bag and where tested from the bags after a few days cooling.

Tensile elongation at break was tested on 7×⅛ in. injection molded bars with a crosshead speed of 2 in./min. using ASTM method D648.

Melt Viscosity (MV) was measured at 250° C. or 266 C using a Tinius Olsen model UE-4-78 rheometer, a weight of 21,6000 g, and an orifice with a 0.042 inch diameter. Samples where dried 1 h at 150° C. prior to testing.

Polyester sodium sulfonate ionomer resins where made by melt reaction of dimethyl terephthalate (DMT), butane diol and sodium sulfo dimethyl isophthalate. The sodium sulfo isophthalate was used at 3 or 5 mole % based on DMT content. The blend was heated with 100–200 ppm titanium octyl titanate catalyst under vacuum until the desired viscosity was achieved. The reaction was cooled and the resin isolated and granulated for compounding and blending.

Examples 1–3

Table 1 shows a series of PBT Ionomer resins with 5 mole % sodium sulfo isophthalate units blended with 30 to 70 wt % Nylon 6,6. As can be seen comparing the examples to the controls with no ERL epoxide; 3,4-epoxycyclohexylmethyl-3,4-epoxycyclohexane carboxylate (ERL4221 from Union Carbide Co.), elongation at beak and melt viscosity are increased in most cases. Blends with higher nylon content tend to show more improvement.

Examples 1–3 all show good appearance with no pearlescence.

TABLE 1

|  | Control Exp. | | | Invention Exp. | | |
| --- | --- | --- | --- | --- | --- | --- |
|  | A | B | C | 1 | 2 | 3 |
| PBT I-5% | 69.85 | 49.85 | 29.85 | 28.65 | 48.65 | 68.65 |
| PA 6,6 | 30 | 50 | 70 | 70 | 50 | 30 |
| ERL | 0 | 0 | 0 | 1.1 | 1.1 | 1.1 |
| NaSt | 0 | 0 | 0 | 0.1 | 0.1 | 0.1 |
| I-1076 | 0.15 | 0.15 | 0.15 | 0.15 | 0.15 | 0.15 |
| MV @ 266° C. | 1988 | 2012 | 2969 | 5638 | 3671 | 2620 |
| % Elong. | 4 | 4 | 6 | 19 | 10 | 5 |

IRGANOX 1076 is a hindered phenol ester antioxidant from Ciba Geigy Co.
NaSt is sodium stearate

Examples 4–6

As shown in Table 2 the 5 mole % PBT ionomer resin of the previous examples with Nylon 6 shows superior elongation with the addition of epoxide. In this case, as in Table 1, sodium stearate (NaSt) was added as a catalyst. Again higher level of nylon favor improved elongation and higher MV. The examples 4–6 showed no pearlescence and good appearance.

blends of both polyamides. All examples show good elongation and appearance. In examples 14–19 a high viscosity PBT (VALOX® 315 from GE Plastics, of 8000 posie @ 250° C., PBT) is blended with the 3% sodium sulfo isophthalate PBT ionomer resin mixture.

TABLE 2

|  | Control Exp. | | | Invention Exp. | | |
| --- | --- | --- | --- | --- | --- | --- |
|  | D | E | F | 4 | 5 | 6 |
| PBT I-5% | 69.85 | 49.85 | 29.85 | 28.65 | 48.65 | 68.65 |
| PA6 | 30 | 50 | 70 | 70 | 50 | 30 |
| ERL | 0 | 0 | 0 | 1.1 | 1.1 | 1.1 |
| NaSt | 0 | 0 | 0 | 0.1 | 0.1 | 0.1 |
| I-1076 | 0.15 | 0.15 | 0.15 | 0.15 | 0.15 | 0.15 |
| MV @ 250° C. | 7958 | 11804 | 18206 | 16884 | 15240 | 12077 |
| % Elong. | 16 | 7 | 22 | 162 | 16 | 13 |

Example 7

In Table 3 a PBT ionomer with only 1 mole % sodium sulfo isophthalate units is blended with nylon 6,6 with and without ERL epoxide. Even with only 1 mole % sodium sulfo isophthalate in the ionomer improved elongation and good appearance is observed.

TABLE 3

|  | Control Exp. G | Invention Exp. 7 |
| --- | --- | --- |
| PBT I-1% | 49.7 | 49.2 |
| PA 6,6 | 50 | 50 |
| ERL | 0 | 0.5 |
| PEPQ | 0.15 | 0.15 |
| I-1076 | 0.15 | 0.15 |
| % Elong. | 15 | 20 |

PEP-Q is an aryl phosphonite stabilizer from Clariant Co.

Examples 8–10

Table 4 shows a series of blends where a 3% sodium sulfo isophthalate PBT of MV 1200–1600 posie @ 250° C. is blended with nylon 6,6, a Methyl methacrylate Butadiene Styrene core shell impact modifier (MBS EXL2691 from the Rohm & Hass Co.) and a standard polybutylene terephthalate homopolymer (PBT) of 700 posie MV @250° C. Note how the presence of both the ionomer resin and epoxide enhance tensile elongation: Exp. 8, 9 and 10. Appearance is significantly improved over control experiment I having no polyester sulfonate resin

TABLE 4

|  | Control Experiments | | Invention Experiments | | |
| --- | --- | --- | --- | --- | --- |
|  | H | I | 8 | 9 | 10 |
| PBTI-3% Low | 18 | 0 | 35.02 | 25.2 | 18 |
| PBT 195 | 18 | 35.02 | 0 | 10.8 | 18 |
| PA 66 | 53.3 | 54 | 54 | 53.02 | 53.02 |
| MBS | 10 | 10 | 10 | 10 | 10 |
| ERL | 0 | 0.98 | 0.98 | 0.98 | 0.98 |
| Tensile Elong. % | 5.6 | 5.7 | 10.1 | 17.66 | 34.3 |

Examples 11–19

Table 5 shows further examples of a 3% PBT ionomer resin with MBS, ERL epoxide and Nylon 6,6, Nylon 6 or

TABLE 5

|  | Invention Experiments | | | | | | | | |
| --- | --- | --- | --- | --- | --- | --- | --- | --- | --- |
|  | 11 | 12 | 13 | 14 | 15 | 16 | 17 | 18 | 19 |
| PBTI-3% High | 35.0 | 35.0 | 35.02 | 24.22 | 24.22 | 24.22 | 17.02 | 17.02 | 17.02 |
| PBT 315 | 2 | 2 | 0 | 10.8 | 10.8 | 10.8 | 18 | 18 | 18 |
| PA 66 | 54 | 45 | 36 | 54 | 45 | 36 | 54 | 45 | 36 |
| PA 6 | 0 | 9 | 18 | 0 | 9 | 18 | 0 | 9 | 18 |
| MBS | 10 | 10 | 10 | 10 | 10 | 10 | 10 | 10 | 10 |
| ERL | 0.98 | 0.98 | 0.98 | 0.98 | 0.98 | 0.98 | 0.98 | 0.98 | 0.98 |
| Tensile Elong. % | 25.3 | 22.9 | 23.3 | 90.2 | 28.4 | 85.1 | 50.8 | 33.2 | 161.8 |

PBTI-3% High  MV = 8000 to 10000 poise @ 250° C.

Example 20

Table 6 shows a blend of 3% PBT sodium sulfo isophthalate with a low viscosity 700 posie standard PBT, Nylon 6,6 and a mixture of two types of SEBS (Styrene-Ethylene Butylene-Styrene) block copolymer sold by Shell Co. as KRATON® G1651 and 1901X FG). The 1901X rubber is modified with a low level of grafted maleic anhydride, the G1651 is an unfunctionalized SEBS rubber. Various additive are also present: PETS is pentaerythritol tetra stearate, a mold release, IRGANOX® 1098 is a hinderd phenol amide antioxidant from Ciba Geigy Co, SEENOX® 412 is a tetra functional thio-ester antioxidant from Ferro Co. and PEP-Q® is a bis phosphonite stabilizer sold by Clariant Co. Note how the added ERL epoxide improves elongation.

TABLE 6

|  | Control Exp. J | Invention Exp. 20 |
| --- | --- | --- |
| PBT I-3% Low | 17 | 17 |
| PBT 195 | 17 | 17 |
| PA 66 | 53.3 | 52.3 |
| Kraton FG 1901X | 2 | 2 |
| Kraton G 1651 | 10 | 10 |
| ERL | 0 | 1 |
| PBTS (mold release) | 0.2 | 0.2 |
| Irganox 1098 | 0.2 | 0.2 |

TABLE 6-continued

|  | Control Exp. J | Invention Exp. 20 |
|---|---|---|
| Seenox 412S | 0.2 | 0.2 |
| PEP-Q | 0.1 | 0.1 |
| Tensile Elong. % | 6.3 | 15.6 |

What is claimed is:

1. A thermoplastic resin composition comprising a compatible resin blend of a polyester sulfonate salt ionomer, a polyamide and at least one difunctional epoxy compound, said at least one difunctional epoxy compound having at least one cyclohexane ring moiety and having two terminal epoxy functional groups, wherein at least one of the two terminal epoxy functional groups is a substituent on the at least one cyclohexane ring moiety.

2. A thermoplastic resin composition according to claim 1 wherein at least one difunctional epoxy compound is selected from the group consisting of bis(3,4-epoxycyclohexyl) adipate; vinylcyclohexene diepoxide; 3,4-epoxycyclohexylmethyl-3,4-epoxycyclohexane carboxylate and mixtures of any of the foregoing.

3. A thermoplastic resin composition of claim 2 wherein said epoxy compound is present from 0.1–5.0 wt. % based on the total composition.

4. A thermoplastic resin composition according to claim 3 wherein said wherein said difunctional epoxy compound comprises 3,4-epoxycyclohexylmethyl-3,4-epoxycyclohexane carboxylate.

5. A thermoplastic resin composition according to claim 1 wherein the said resin blend comprises about 5 to 95 wt. % polyester sulfonate salt ionomer as part of resin blend.

6. A thermoplastic resin composition according to claim 1 wherein said polyester ionomer comprises an alkylene aryl polyester copolymers having metal sulfonate units represented by the formula IA:

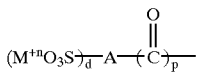

or the formula IB:

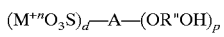

where p=1–3, d=1—3, p+d=2–6, n=1–5, M is a metal, and A is an aryl group containing one or more aromatic rings where the sulfonate substituent is directly attached to an aryl ring, R" is a divalent alkyl group and the metal sulfonate group is bound to the polyester through ester linkages.

7. A thermoplastic resin composition according to claim 6 wherein p=2, d=1, and M is an alkali or alkaline earth metal.

8. A thermoplastic resin composition of claim 6 where the metal sulfonate polyester copolymer (a) has the formula III:

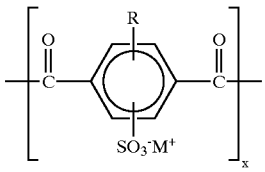

where the ionomer units, x, are from 0.1–50 mole %; R is halogen, alkyl, aryl, alkylaryl or hydrogen; $R^1$ is derived from a diol comprising straight chain, branched, or cycloaliphatic alkane diols containing from 2 to 12 carbon atoms; and $A^1$ is a divalent aryl radical.

9. A thermoplastic resin composition of claim 8 wherein R is hydrogen,
x=1.0–10 mole percent, $R^1$ is $C_2$–$C_8$ alkyl, and $A^1$ is derived from isophthalic or terephthalic acid or a mixture of the two.

10. A thermoplastic resin composition of claim 8 wherein the metal sulfonate polyester of formula III is an alkylene aryl polyester wherein $A^1$ is the residue from a diacid component of isophthalic or terepthalic acid and derivatives thereof and $R^1$ is the residue from a diol component selected from the group consisting of ethylene glycol, propanediol, butanediol, and cyclohexanedimethanol, and derivatives thereof.

11. A thermoplastic resin composition according to claim 1 containing a catalyst.

12. A composition of claim 11 wherein the catalyst is a metal halide, metal carboxylate, metal carbonate or metal bicarbonate.

13. A composition of claim 11 wherein the catalyst is present from 0.01 to 1.0 wt. % of the composition.

* * * * *